US007028477B2

(12) United States Patent
Yoshida et al.

(10) Patent No.: US 7,028,477 B2
(45) Date of Patent: Apr. 18, 2006

(54) METHOD FOR GENERATING ELECTRIC POWER AND ELECTRIC BATTERY

(75) Inventors: Tomoko Yoshida, Nagoya (JP); Tetsuo Tanabe, Nagoya (JP); Allen Chen, Nagoya (JP)

(73) Assignee: National University Corporation Nagoya University, Nagoya (JP)

( * ) Notice: Subject to any disclaimer, the term of this patent is extended or adjusted under 35 U.S.C. 154(b) by 0 days.

(21) Appl. No.: 10/924,877

(22) Filed: Aug. 25, 2004

(65) Prior Publication Data

US 2005/0077876 A1 Apr. 14, 2005

(30) Foreign Application Priority Data

Sep. 4, 2003 (JP) ............................ 2003-312863

(51) Int. Cl.
*B60K 16/00* (2006.01)

(52) U.S. Cl. .................................. 60/641.8; 60/641.15

(58) Field of Classification Search ............... 60/641.8, 60/641.15, 645

See application file for complete search history.

(56) References Cited

U.S. PATENT DOCUMENTS

| | | | | |
|---|---|---|---|---|
| 4,117,506 | A * | 9/1978 | Carlson et al. | 136/255 |
| 4,200,473 | A * | 4/1980 | Carlson | 136/255 |
| 4,617,421 | A * | 10/1986 | Nath et al. | 136/244 |
| 4,849,029 | A * | 7/1989 | Delahoy | 136/249 |
| 5,660,646 | A * | 8/1997 | Kataoka et al. | 136/251 |
| 5,849,107 | A * | 12/1998 | Itoyama et al. | 136/248 |
| 6,278,055 | B1 * | 8/2001 | Forrest et al. | 136/263 |

* cited by examiner

*Primary Examiner*—Hoang Nguyen
(74) *Attorney, Agent, or Firm*—Oliff & Berridge, PLC

(57) ABSTRACT

A plurality of metallic members are laminated via corresponding insulating members to form a metallic layered structure. Then, an energy beam is irradiated onto the metallic layered structure to generate an electric energy through the interactions between the metallic members of the metallic layered structure and the energy beam. The electric energy is extracted from the metallic layered structure. The metallic members are made of at least two kinds of metallic materials with respective different atomic numbers.

30 Claims, 1 Drawing Sheet

METHOD FOR GENERATING ELECTRIC POWER AND ELECTRIC BATTERY

BACKGROUND OF THE INVENTION

1. Field of the Invention

This invention relates to a method for generating electric power and an electric battery.

2. Description of the Related Art

Much attention is paid to a solar battery which converts optical energy into electric energy, so that demand of new electric energy generating means is increased for the solar battery. Since the solar battery can be made only of semiconductor material such as Si, CdS or GaAs, however, the energy conversion efficiency of the solar battery depends on the purity of the semiconductor material and the manufacturing process (film-forming condition and film junction condition) thereof. As a result, the solar battery has difficulty in controlling the performance. Moreover, the electric conversion efficiency of the solar battery is not developed sufficiently, so that the solar battery requires large optical energy absorption area in order to generate sufficient electric power. As a result, the cost in manufacture of the solar battery is increased.

In addition, it may be that the solar battery can not supply the electric power sufficiently because the intensity of sunlight as the energy source for the solar battery depends largely on time zone (day and night) and weather.

SUMMARY OF THE INVENTION

It is an object of the present invention, in this point of view, to provide a new method for generating electric power and a new electric battery utilizing the generating method of electric power, whereby electric energy can be generated high efficiently in low cost.

For achieving the above object, this invention relates to a method for generating electric power, comprising the steps of:

laminating a plurality of metallic members via corresponding insulating members to form a metallic layered structure, irradiating an energy beam onto the metallic layered structure to generate electric energy through interactions between the metallic members and the energy beam, and extracting the electric energy from the metallic layered structure, wherein the metallic members are made of at least two kinds of metallic materials with respective different atomic numbers.

Also, this invention relates to an electric battery, comprising:

a metallic layered structure wherein a plurality of metallic members made of at least two kinds of metallic materials with respective different atomic numbers are laminated via corresponding insulating members, and an energy irradiation source for irradiating an energy beam onto the metallic layered structure to generate an electric energy through interactions between the metallic members of the metallic layered structure and the energy beam.

In view of energy problem and environment problem at present and in future, it is desired to develop an electric power-generating system which does not create and discharge harmful substance such as $CO_2$, NOx and SOx. In view of cost in manufacture and the above-mentioned problems relating to the solar battery, it is extremely valid to utilize radiation from radioactive waste or from cosmic space. Therefore, the inventors had intensely studied to develop a new method for generating electric power and a new electric battery utilizing the generating method of electric power from the above-mentioned viewpoints.

In the generating method of electric power and the electric battery of the present invention, when an energy beam as a radiation is irradiated onto the metallic layered structure made of the metallic members and the insulating members, each separate the metallic members, interactions (Compton scatterings, etc.) are generated between the energy beam and the metallic members of the metallic layered structure to generate secondary electrons in each metallic member. Then, since the secondary electrons are partially discharged outside from the metallic member, electron deficiencies are created in the metallic member. Therefore, when the metallic layered structure is incorporated in a given electric circuit, an electric energy can be generated from the electromotive force originated from the electric deficiencies of the metallic members of the metallic layered structure.

In the generating method of electric power and the electric battery of the present invention, the metallic members of the metallic layered structure are made of at least two kinds of metallic materials with respective different atomic numbers. In other words, some of the metallic members of the metallic layered structure are made of a different metallic material from the one of the others of the metallic members of the metallic layered structure. Therefore, the conversion efficiency into electric energy, that is, the generating efficiency of electric energy of the energy beam is increased, and thus, the intended electric energy can be increased.

In the case of making the metallic members of the metallic layered structure of at least two kinds of metallic materials with respective different atomic numbers, the cause of the increase in the generating efficiency of the electric energy is not apparent at present, but it can be considered as that the difference in secondary electric number of the metallic members made of metallic materials with respective different atomic numbers is generated to change the electric deficiencies of the corresponding metallic members and to cause relatively large electrons (current).

The generating efficiency of the electric energy can be controlled by adjusting the arrangement number and/or the arrangement distance of the metallic numbers. Moreover, the generating efficiency of the electric energy can be also controlled by adjusting the irradiation area of the energy beam onto the metallic members. In addition, the generating efficiency of the electric energy can be also controlled easily by adjusting the corresponding thicknesses of the metallic members and the corresponding kinds of the metallic members only if the above-mentioned requirement can be satisfied.

According to the present invention, therefore, a desired electric energy can be easily obtained. Moreover, if a radiation from a radioactive waste is employed as the energy beam, the generating method of electric power and the electric battery can be rendered longer operating life and maintenance free.

In a preferred embodiment of the present invention, in the metallic layered structure, the metallic members made of the corresponding different metallic materials are disposed alternately. In this case, the conversion efficiency into the electric energy of the energy beam can be increased. The cause of the increase in the conversion efficiency of the energy beam can be considered as that in the metallic layered structure, the amount of secondary electron to be discharged from each metallic member and the amount of secondary electron to be generated in each metallic member can be balanced so as to maximize the generating efficiency of the electric energy.

In another preferred embodiment of the present invention, the thickness of each metallic member is set to 5 mm or below. In addition, in this case, the thickness of the metallic member made of a metallic material with a lower atomic number is set smaller than the thickness of the metallic member made of a higher atomic number metallic material. Therefore, the conversion efficiency into the electric energy of the energy beam can be increased. The cause of the increase in conversion efficiency of the energy beam can be considered as that in the metallic layered structure, the amount of secondary electron to be discharged from each metallic member and the amount of secondary electron to be generated in each metallic member can be balanced so as to maximize the generating efficiency of the electric energy.

As mentioned above, according to the present invention can be provided a new method for generating electric power and a new electric battery utilizing the generating method of electric power, whereby electric energy can be generated high efficiently in low cost.

BRIEF DESCRIPTION OF THE DRAWINGS

For better understanding of the present invention, reference is made to the attached drawings, wherein.

DESCRIPTION OF THE PREFERRED EMBODIMENTS

Figure 1:
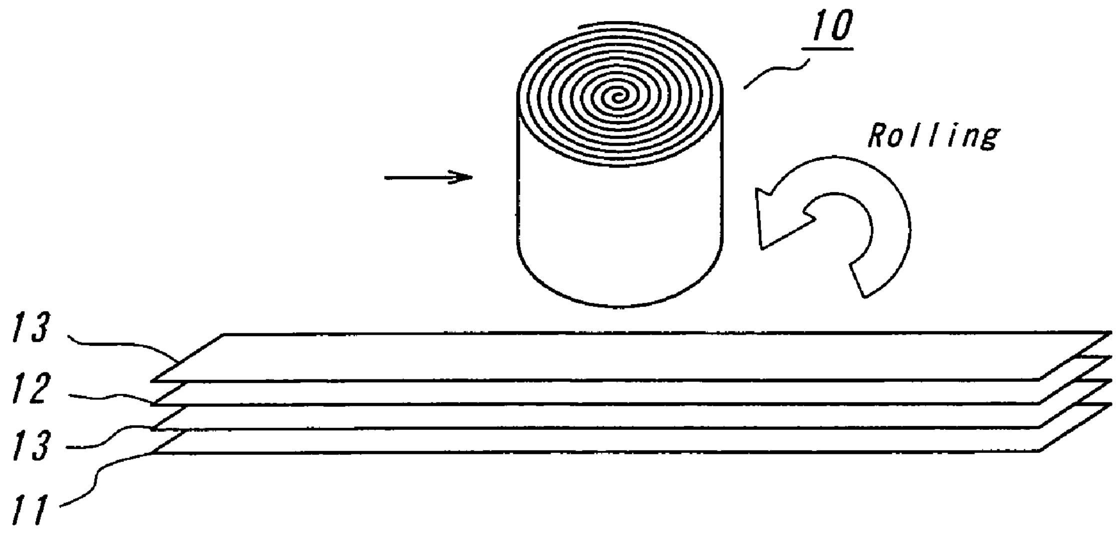
FIG. 1 is a structural view illustrating an electric battery according to the present invention.

This invention will be described in detail with reference to the accompanying drawings. FIG. 1 is a structural view illustrating an electric battery according to the present invention. In the electric battery illustrated in FIG. 1, a ribbon-shaped first metallic member 11 and a ribbon-shaped second metallic member 12 are prepared and rolled each other via an ribbon-shaped insulating member 13 to form a metallic layered structure 10. In this embodiment, in the formation of the metallic layered structure 10, in order to prevent the contact between the lower first metallic member 11 and the upper second metallic member 12, the same insulating member 13 is disposed on the second metallic member 12.

The first metallic member 11 and the second metallic member 12 are made of metallic materials with respective different atomic numbers. In this case, it is desired that the difference in atomic number between the metallic materials becomes larger, and concretely, is set to not less than 5, preferably 10, more preferably 20 and particularly 30.

In order to work the metallic layered structure 10 as an electric battery, an energy beam is irradiated onto the side of the metallic layered structure 10 from a not shown energy irradiation source. In this case, interactions (Compton scatterings, etc.) are generated between the energy beam and the metallic members 11 and 12 of the metallic layered structure 10 to generate secondary electrons in each metallic member. Then, since the secondary electrons are partially discharged outside from the metallic members 11 and 12, electron deficiencies are created in the metallic members 11 and 12. Therefore, when the metallic layered structure 10 with the metallic members 11 and 12 is incorporated in a given electric circuit, an electric energy can be generated from the electromotive force originated from the electric deficiencies of the metallic members 11 and 12.

A radiation particularly from radioactive waste can be utilized as the energy beam. In this case, since the energy beam can be provided semi-permanently, the metallic layered structure 10 can be rendered longer operating life and maintenance free as an electric battery. Instead of the radiation from the radioactive waste, a normal radiation such as $\alpha$ ray, $\beta$ ray, $\gamma$ ray and X ray can be used. In this case, a corresponding radiation source is employed as the energy irradiation source.

Moreover, another energy beam except the radiation can be employed as the energy beam. For example, an electron beam, an electromagnetic wave or a laser beam may be employed.

The generating efficiency of the electric energy of the electric battery composed of the metallic layered structure 10 can be controlled by adjusting the arrangement number and/or the arrangement distance of the metallic numbers 11 and 12. Moreover, the generating efficiency of the electric energy can be also controlled by adjusting the irradiation area of the energy beam onto the metallic members 11 and 12. In addition, the generating efficiency of the electric energy can be also controlled easily by adjusting the thicknesses and the kinds of the metallic members 11 and 12 only if the above-mentioned requirement can be satisfied.

In view of the thickness control of the metallic members 11 and 12, the thicknesses of the metallic members 11 and 12 are set to 5 mm or below. In this case, the generating efficiency of electric energy of the electric battery composed of the metallic layered structure 10 can be more increased, which results from that the secondary electrons generated in the metallic members 11 and 12 are discharged effectively and efficiently from the metallic members 11 and 12 due to the interactions between the energy beam and the metallic members 11, 12.

It is desired that the thicknesses of the metallic members 11 and 12 are set to 0.01 mm or over. If the thickness of the metallic members 11 and 12 are set to less than 0.01 mm, the amount of secondary electron to be generated in the metallic members 11 and 12 may be decreased to reduce the generating efficiency of the electric energy.

In the case of setting the thicknesses of the metallic members 11 and 12 to 5 mm or below, it is desired that the thickness of the first metallic member 11 or the second metallic member 12 made of a lower atomic number metallic material is set smaller than the thickness of the second metallic member 12 or the first metallic member 11 made of a higher atomic number metallic material. In other words, the thickness of a metallic member made of a lower atomic number metallic material is set smaller than the thickness of a metallic member made of a higher atomic number metallic material. In this case, the generating efficiency of the electric energy can be more increased.

The cause of the increase in the generating efficiency of the electric energy can be considered as that in the metallic layered structure 10, the amount of secondary electron to be discharged from the metallic members 11, 12 and the amount of secondary electron to be generated in the metallic members 11, 12 can be balanced so as to maximize the generating efficiency of the electric energy.

In view of the arrangement distance control of the metallic members 11 and 12, the thickness of the insulating member 13 is set within 0.01–1 mm. If the thickness of the insulating member 13 is set larger than 1 mm, the secondary electrons discharged from the metallic members 11 and 12 are absorbed considerably in the insulating member 13 to reduce the generating efficiency of the electric energy. If the thickness of the insulating member 13 is set smaller than 0.01 mm, it may be that the electric insulation between the metallic members 11 and 12 can not be realized sufficiently to reduce the generating efficiency of the electric energy which is inherently originated from the feature of the present invention of the metallic members 11 and 12 being made of metallic materials with respective different atomic numbers.

Herein, the rolling number of the metallic layered structure 10 can be set appropriately.

Figure 2:
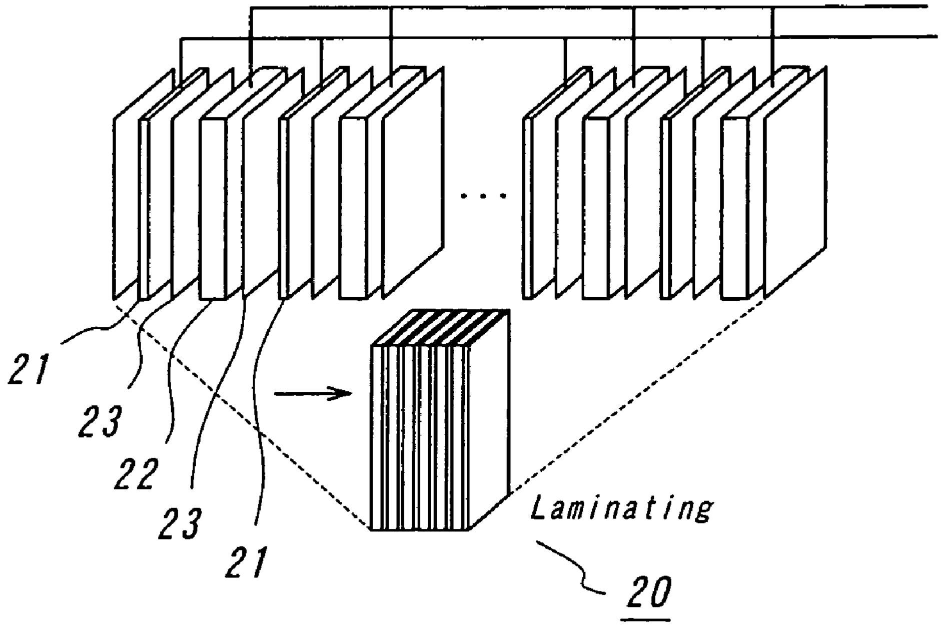
FIG. 2 is a structural view illustrating another electric battery according to the present invention.

FIG. 2 is a structural view illustrating another electric battery according to the present invention. In the electric battery illustrated in FIG. 1, plate-shaped first metallic members 21 and plate-shaped second metallic members 22 are prepared and laminated alternately and respectively via corresponding plate-shaped insulating members 23, to form a metallic layered structure 20. The first metallic member 21 and the second metallic member 22 are made of metallic materials with respective different atomic numbers. In this case, it is desired that the difference in atomic number between the metallic materials becomes larger, and concretely, is set to not less than 5, preferably 10, more preferably 20 and particularly 30.

In the metallic layered structure 20, since the first metallic members 21 and the second metallic members 22 made of the metallic materials with the respective different atomic numbers are laminated alternately, the generating efficiency of the electric energy can be more increased, which results from that in the metallic layered structure 20, the amount of secondary electron to be discharged from the metallic members 21, 22 and the amount of secondary electron to be generated in the metallic members 21, 22 can be balanced so as to maximize the generating efficiency of the electric energy.

In order to work the metallic layered structure 20 as an electric battery, an energy beam is irradiated onto one main surface of the metallic layered structure 20 from a not shown energy irradiation source. In this case, interactions (Compton scatterings, etc.) are generated between the energy beam and the metallic members 21 and 22 of the metallic layered structure 20. Therefore, when the metallic layered structure 20 with the metallic members 21 and 22 is incorporated in a given electric circuit, an electric energy can be generated from the electromotive force originated from the electric deficiencies of the metallic members 21 and 22.

In this embodiment, too, a radiation particularly from radioactive waste can be utilized as the energy beam. In this case, since the energy beam can be provided semi-permanently, the metallic layered structure 20 can be rendered longer operating life and maintenance free as an electric battery. Instead of the radiation from the radioactive waste, a normal radiation such as α ray, β ray, γ ray and X ray can be also used. In this case, a corresponding radiation source is employed as the energy irradiation source.

Moreover, another energy beam except the radiation can be employed as the energy beam. For example, an electron beam, an electromagnetic wave or a laser beam may be employed.

The generating efficiency of the electric energy of the electric battery composed of the metallic layered structure 20 can be controlled easily by adjusting the arrangement number and/or the arrangement distance of the metallic numbers 21 and 22. Moreover, the generating efficiency of the electric energy can be also controlled by adjusting the irradiation area of the energy beam onto the metallic members 21 and 22. In addition, the generating efficiency of the electric energy can be also controlled easily by adjusting the thicknesses and the kinds of the metallic members 21 and 22 only if the above-mentioned requirement can be satisfied.

In view of the thickness control of the metallic members 21 and 22, the thicknesses of the metallic members 21 and 22 are set to 5 mm or below. In this case, the generating efficiency of electric energy of the electric battery composed of the metallic layered structure 20 can be more increased, which results from that the secondary electrons generated in the metallic members 21 and 22 are discharged effectively and efficiently from the metallic members 21 and 22 due to the interactions between the energy beam and the metallic members 21, 22.

It is desired that the thicknesses of the metallic members 21 and 22 are set to 0.01 mm or over. If the thickness of the metallic members 21 and 22 are set to less than 0.01 mm, the amount of secondary electron to be generated in the metallic members 21 and 22 may be decreased to reduce the generating efficiency of the electric energy.

In the case of setting the thicknesses of the metallic members 21 and 22 to 5 mm or below, it is desired that the thickness of the first metallic member 21 or the second metallic member 22 made of a lower atomic number metallic material is set smaller than the thickness of the second metallic member 22 or the first metallic member 21 made of a higher atomic number metallic material. In other words, the thickness of a metallic member made of a lower atomic number metallic material is set smaller than the thickness of a metallic member made of a higher atomic number metallic material. In this case, the generating efficiency of the electric energy can be more increased.

The cause of the increase in the generating efficiency of the electric energy can be considered as that in the metallic layered structure 20, the amount of secondary electron to be discharged from the metallic members 21, 22 and the amount of secondary electron to be generated in the metallic members 21, 22 can be balanced so as to maximize the generating efficiency of the electric energy.

In view of the arrangement distance control of the metallic members 21 and 22, the thickness of the insulating member 23 is set within 0.01–1 mm. If the thickness of the insulating member 23 is set larger than 1 mm, the secondary electrons discharged from the metallic members 21 and 22 are absorbed considerably in the insulating member 23 to reduce the generating efficiency of the electric energy. If the thickness of the insulating member 23 is set smaller than 0.01 mm, it may be that the electric insulation between the metallic members 21 and 22 can not be realized sufficiently to reduce the generating efficiency of the electric energy which is inherently originated from the feature of the present invention of the metallic members 21 and 22 being made of metallic materials with respective different atomic numbers.

Herein, in the metallic layered structure 20, the layered number can be controlled appropriately.

EXAMPLES

Example 1

A ribbon-shaped SUS304 member with a width of 10 cm and a thickness of 0.1 mm was prepared, and a ribbon-shaped Al member with a width of 10 cm and a thickness of 0.2 mm was prepared. Then, the SUS304 member and the Al member were rolled each other via a bond paper with a thickness of 0.2 mm to form a metallic layered structure as illustrated in FIG. 1. The rolling number was set to 33. Then, a γ ray (about 1.45 Gy/sec) was irradiated onto the side of the metallic layered structure. A constant current of 0.583 μA was generated under a load resistance of 10 kΩ or below.

Comparative Example 1

A ribbon-shaped SUS304 member with a width of 10 cm and a thickness of 0.1 mm and a ribbon-shaped SUS304 member with a width of 10 cm and a thickness of 0.01 mm were prepared. The SUS304 members were rolled each other via a bond paper with a thickness of 0.2 mm to form a metallic layered structure as illustrated in FIG. 1. The rolling number was set to 33. Then, a γ ray (about 1.45 Gy/sec) was irradiated onto the side of the metallic layered structure. A constant current of 0.034 μA was generated under a load resistance of 10 kΩ or below.

Example 2

Six plate-shaped SUS304 members with a width of 5 cm, a height of 10 cm and a thickness of 0.01 mm were prepared, and six plate-shaped Al members with a width of 5 cm, a height of 10 cm and a thickness of 0.01 mm were prepared. Then, the SUS304 members and the Al members were laminated alternately and respectively via corresponding bond papers with a thickness of 0.2 mm to form a metallic layered structure as illustrated in FIG. 2. The total layered number was 12. Then, a γ ray (about 1.45 Gy/sec) was irradiated onto one main surface of the metallic layered structure in the thickness direction. A constant current of 0.065 μA was generated under a load resistance of 10 kΩ or below.

Example 3

Except that the thickness of the SUS304 members is set to 0.2 mm, a metallic layered structure was formed in the same manner as in Example 2. The total layered number was 12. Then, a γ ray (about 1.45 Gy/sec) was irradiated onto one main surface of the metallic layered structure in the thickness direction. A constant current of 0.097 μA was generated under a load resistance of 10 kgΩ or below.

Example 4

Except that the layered number of the SUS304 member and the layered number of the Al member were set to 14, respectively, a metallic layered structure was formed in the same manner as in Example 3. Herein, the total layered number of the metallic layered structure was 28. Then, a γ ray (about 1.45 Gy/sec) was irradiated onto one main surface of the metallic layered structure in the thickness direction. A constant current of 0.162 μA was generated under a load resistance of 10 kΩ or below.

Comparative Example 2

Six SUS304 members with a width of 5 cm, a height of 10 cm and a thickness of 0.1 mm were prepared, and six SUS304 members with a width of 5 cm, a height of 10 cm and a thickness of 0.01 mm were prepared. The thicker and the thinner SUS304 members were laminated alternately and respectively via corresponding bond papers with a thickness of 0.2 mm to form a metallic layered structure as illustrated in FIG. 2. The total layered number was 12. Then, a γ ray (about 1.45 Gy/sec) was irradiated onto one main surface of the metallic layered structure in the thickness direction. A constant current of 0.028 μA was generated under a load resistance of 10 kΩ or below.

Comparing Example 1 with Comparative Example 1, and Examples 2–4 with Comparative Example 2, the current, and thus, the generating efficiency of electric energy of the metallic layered structure made of the SUS304 members and the Al members becomes larger than the one of the metallic layered structure made only of the SUS304 members.

Comparing Example 2 with Example 3, by setting the thickness of the Al member with a lower atomic number smaller than the thickness of the SUS304 member with a higher atomic number, the current, and thus, the generating efficiency of electric energy of the metallic layered structure can be more increased. Moreover, comparing Example 3 with Example 4, the current, and thus, the generating efficiency of electric energy is increased as the layered number is increased within a layered number range of 10–30.

Although the present invention was described in detail with reference to the above examples, this invention is not limited to the above disclosure and every kind of variation and modification may be made without departing from the scope of the present invention.

In the second embodiment, although the metallic members 21 and the metallic members 22 are laminated alternately by the corresponding different material, the alternate lamination is not always required. For example, the metallic members 21 and 22 may be laminated by two or three layers.

Moreover, in the embodiments as described previously, although two kinds of metallic members are employed, three kinds or over of metallic members may be employed.

The present invention can be utilized in energy industrial field such as an electric power company, space technology industrial field and atomic power field to dispose radioactive waste such as nuclear fuel waste.

What is claimed is:

1. A method for generating electric power, comprising the steps of:

laminating a plurality of metallic members via corresponding insulating members to form a metallic layered structure, irradiating an energy beam onto said metallic layered structure to generate electric energy through interactions between said metallic members and said energy beam, and extracting said electric energy from said metallic layered structure, wherein said metallic members are made of at least two kinds of metallic materials with respective different atomic numbers.

2. The generating method as defined in claim 1, wherein said metallic materials are different in atomic number from one another by not less than 5.

3. The generating method as defined in claim 2, wherein said metallic materials are different in atomic number from one another by not less than 10.

4. The generating method as defined in claim 1, wherein said metallic members are laminated alternately by a corresponding different material.

5. The generating method as defined in claim 1, wherein a generating efficiency of said electric energy is controlled by adjusting thicknesses of said metallic members.

6. The generating method as defined in claim 5, wherein said thicknesses of said metallic members are set to 5 mm or below.

7. The generating method as defined in claim 6, wherein a thickness of said metallic member with a lower atomic number is set smaller than a thickness of said metallic member with a higher atomic number.

8. The generating method as defined in claim 1, wherein a generating efficiency of said electric energy is controlled by adjusting an arrangement number of said metallic members.

9. The generating method as defined in claim 1, wherein a generating efficiency of said electric energy is controlled by adjusting an arrangement distance of said metallic members.

10. The generating method as defined in claim 9, wherein a thickness of said insulating members is set within 0.01–1 mm.

11. The generating method as defined in claim 1, wherein a generating efficiency of said electric energy is controlled by adjusting an irradiation area of said energy beam for said metallic members.

12. The generating method as defined in claim 1, wherein said metallic members have rolling shapes, and said metallic layered structure has a corresponding rolling shape.

13. The generating method as defined in claim 12, wherein said energy beam is irradiated onto a side of said metallic layered structure with said corresponding rolling shape.

14. The generating method as defined in claim 1, wherein said metallic member have plate shapes, and said metallic layered structure has a corresponding plate shape.

15. The generating method as defined in claim 14, wherein said energy beam is irradiated onto one main surface of said metallic layered structure in a layered direction.

16. The generating method as defined in claim 1, wherein some of said metallic members are made of Al, and the others of said metallic members are made of stainless steel.

17. The generating method as defined in claim 1, wherein said energy beam is a radiation.

18. The generating method as defined in claim 17, wherein said radiation is emitted from radioactive waste.

19. An electric battery, comprising:

a metallic layered structure wherein a plurality of metallic members made of at least two kinds of metallic materials with respective different atomic numbers are laminated via corresponding insulating members, and an energy irradiation source for irradiating an energy beam onto said metallic layered structure to generate an electric energy through interactions between said metallic members of said metallic layered structure and said energy beam.

20. The electric battery as defined in claim 19, wherein said metallic materials are different in atomic number from one another by not less than 5.

21. The electric battery as defined in claim 20, wherein said metallic materials are different in atomic number from one another by not less than 10.

22. The electric battery as defined in claim 19, wherein said metallic members are laminated alternately by a corresponding different material.

23. The electric battery as defined in claim 19, wherein thicknesses of said metallic members are set to 5 mm or below.

24. The electric battery as defined in claim 23, wherein a thickness of said metallic member with a lower atomic number is set smaller than a thickness of said metallic member with a higher atomic number.

25. The electric battery as defined in claim 19, wherein a thickness of said insulating members is set within 0.01–1 mm.

26. The electric battery as defined in claim 19, wherein said metallic members have rolling shapes, and said metallic layered structure has a corresponding rolling shape.

27. The electric battery as defined in claim 19, wherein said metallic member have plate shapes, and said metallic layered structure has a corresponding plate shape.

28. The electric battery as defined in claim 19, wherein some of said metallic members are made of Al, and the others of said metallic members are made of stainless steel.

29. The electric battery as defined in claim 19, wherein said energy irradiation source is a radiation source.

30. The electric battery as defined in claim 29, wherein said radiation source comprises radioactive waste.

* * * * *